March 14, 1967     P. M. T. COBLEY     3,309,020
ENGINE COOLING AND INTERIOR HEATING SYSTEMS IN MOTOR VEHICLES
Filed Jan. 15, 1964     4 Sheets-Sheet 1
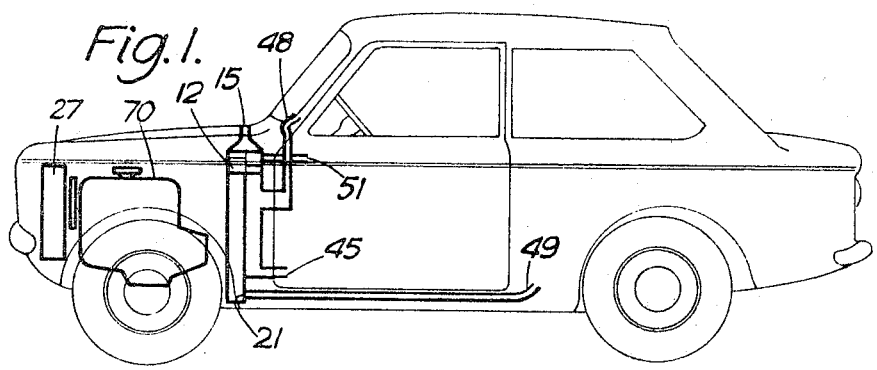
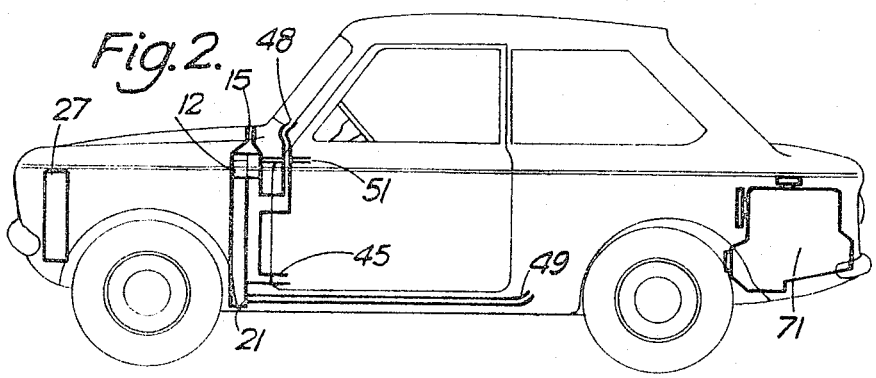
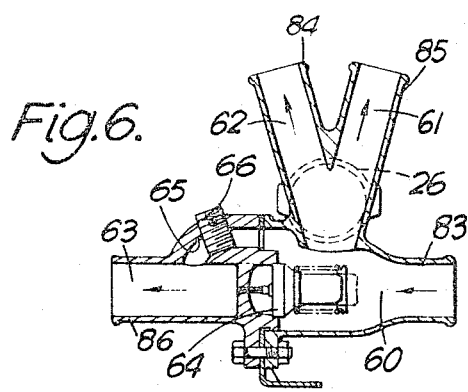
INVENTOR
PATRICK M.T. COBLEY
BY McKinney & McKinney
ATTYS

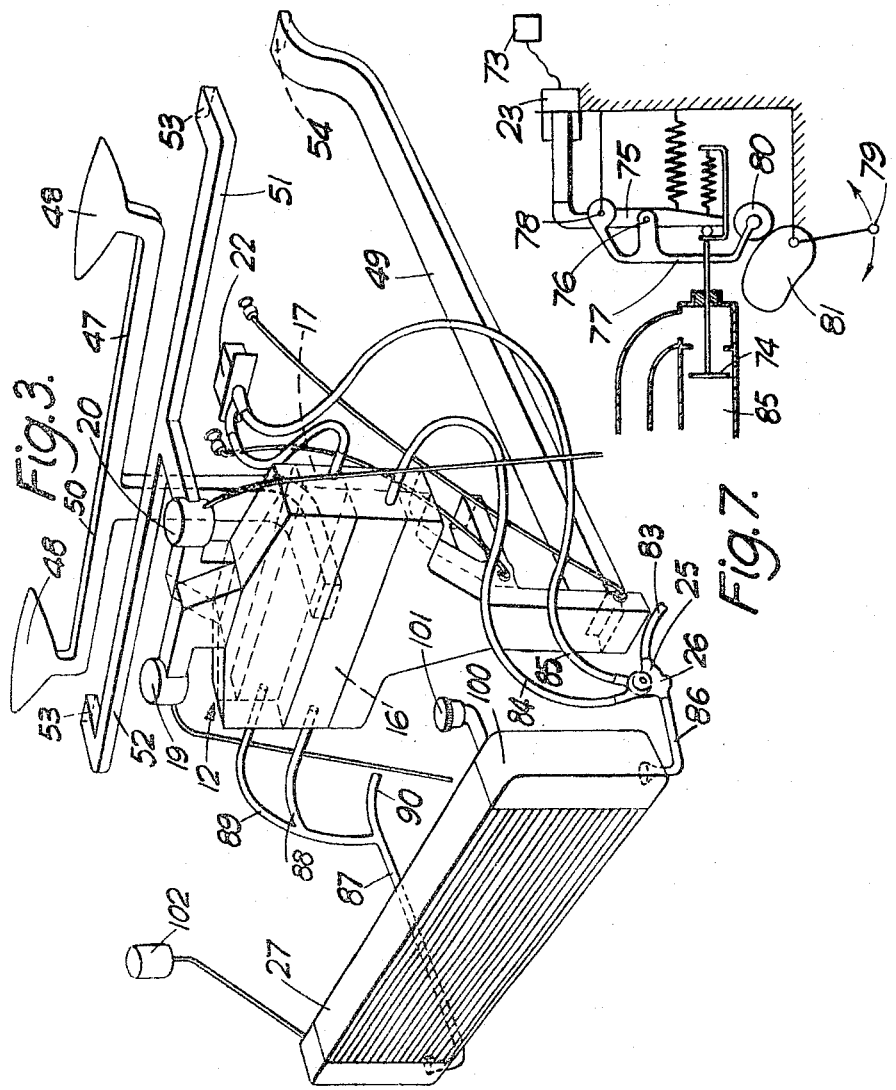

March 14, 1967 P. M. T. COBLEY 3,309,020
ENGINE COOLING AND INTERIOR HEATING SYSTEMS IN MOTOR VEHICLES
Filed Jan. 15, 1964 4 Sheets-Sheet 3

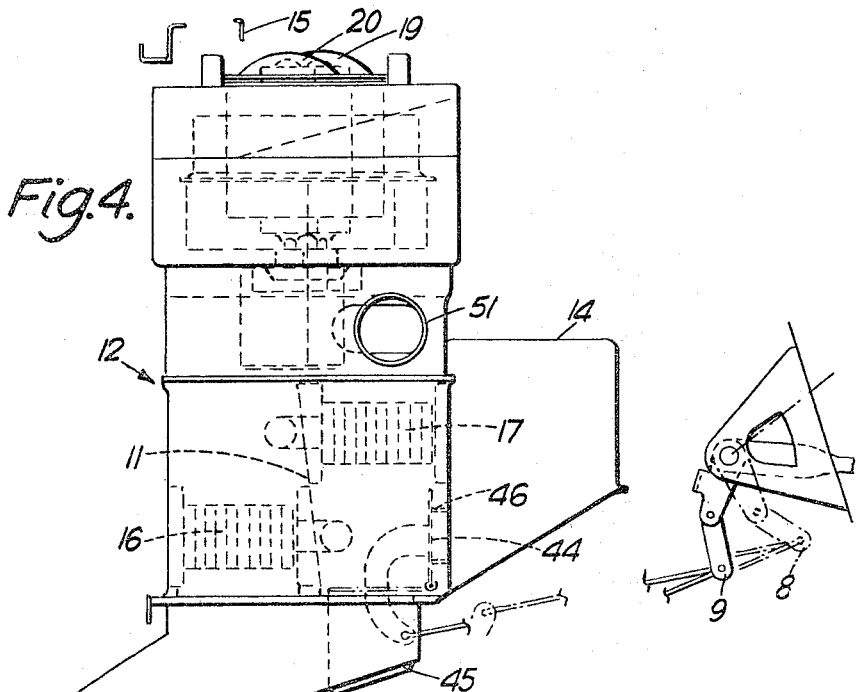

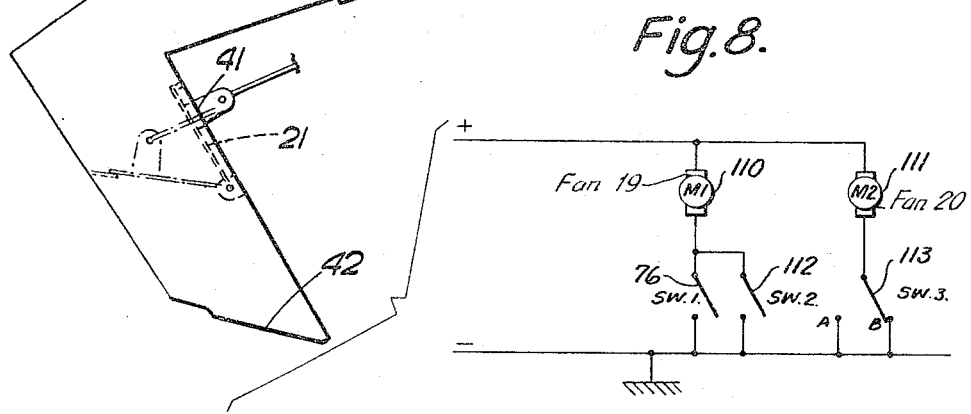

M1. NO. 1. BLOWER MOTOR
M2. NO. 2. BLOWER MOTOR
SW.1. SOPAC THERMOSTATIC SWITCH
SW.2. MECHANICAL "COURTESY TYPE" SWITCH ATTACHED TO LEVER CONTROL WHICH
    ACTUATED "DUMP" AND HEAT TO REAR OF CAR VALVE
SW.3. LUCAS 57SA. SWITCH
R.1. RESISTOR (1.2Ω) MOUNTED ON VEHICLE PANEL FOR HEAT DISSIPATION
    N.B. RESISTOR SHOULD BE OF 20 WATT RATING. (MINIMUM)

INVENTOR
PATRICK M.T. COBLEY
BY- Mawhinney & Mawhinney
ATTYS.

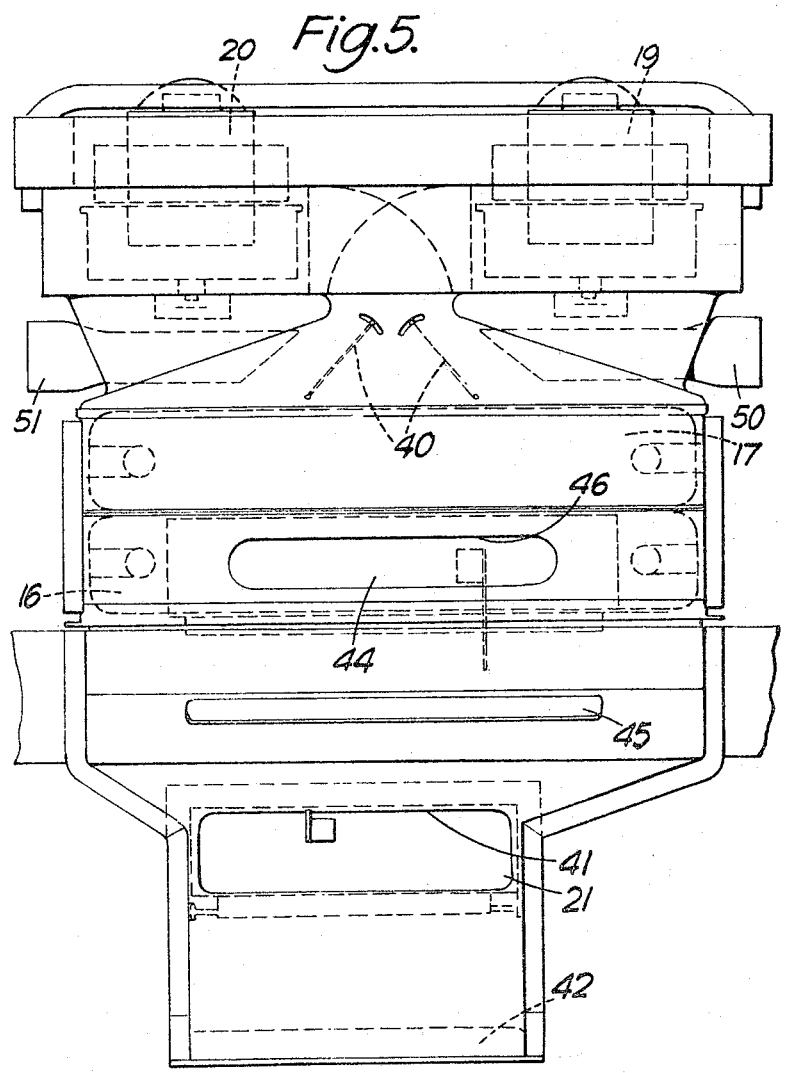

United States Patent Office 3,309,020
Patented Mar. 14, 1967

3,309,020
ENGINE COOLING AND INTERIOR HEATING SYSTEMS IN MOTOR VEHICLES
Patrick Milo Thomas Cobley, Coventry, England, assignor to Humber Limited, Coventry, England a British company
Filed Jan. 15, 1964, Ser. No. 337,953
Claims priority, application Great Britain, Jan. 16, 1963, 2,024/63
7 Claims. (Cl. 237—8)

The invention comprises improvements in engine cooling and interior heating systems in motor vehicles.

The invention provides a motor vehicle having means which serve the dual function of cooling the vehicle engine and regulating the temperature inside the passenger compartment, which means comprise a two-part heat exchanger through both parts of which flows engine coolant liquid and over both parts of which flows air, means for directing at least some of the air which flows over one part into the passenger compartment, means for varying the amount of coolant which flows through the said one part which means is automatically responsive to the temperature of the air flowing into, or within, the passenger compartment to tend to maintain the said temperature substantially constant, and means for maintaining the air which flows over the other part outside the passenger compartment.

Preferably the two parts of the heat exchanger are connected in parallel in the coolant circuit.

It is preferred that the temperature, or temperature range, to which the means are responsive, is variable.

The vehicle may have means, operable at will or automatically for directing the air, or part of it, which flows over the other part of the heat exchanger into the compartment.

The vehicle may have means by which air which flows through the said one part can be excluded from the passenger compartment.

There may be included a further heat exchanger or heat exchanger part and means for automatically limiting or precluding flow of coolant through the further exchanger or part until the coolant temperature in some other part of the coolant system reaches a predetermined value.

A blower may be provided for blowing air or inducing air flow through said one heat exchanger part.

There may also be included a blower for causing air flow through said other heat exchanger part and means operable when the temperature at some point in the coolant system reaches a predetermined value (e.g. higher than the predetermined value aforesaid) to cause the blower to operate.

The engine may be behind the passenger compartment and the two part heat exchanger in front (e.g. immediately in front) of the compartment, or alternatively both the engine and the two part heat exchanger may be in front of the compartment.

A specific embodiment of a heater engine-cooling system according to the invention, and two embodiments of the system mounted in a vehicle, will now be described by way of example, and with reference to the accompanying drawings in which:

FIGURE 1 is a diagrammatic view of a front-engined vehicle embodying the system, FIGURE 2 is a diagrammatic view of a rear-engined vehicle embodying the system, FIGURE 3 is an elevation of the system, FIGURE 4 is a fore and aft section through the heater cooler unit, FIGURE 5 is a rear view of the unit of FIGURE 4 with the bulkhead removed, FIGURE 6 is a sectional view of the valve unit, FIGURE 7 is a view of the metering valve unit, and FIGURE 8 is a diagram of the electrical circuit for the fans.

As can be seen from FIGURES 1 and 2 the systems can be fitted equally well to a vehicle having a front engine 70 or a rear engine 71.

The system comprises a heater engine cooling unit 12, mounted at the front bulkhead 14 of the passenger compartment. The heater engine-cooling unit comprises two separate parallel heat exchanger parts 16, 17. Air is ducted from a vent 15 in the vehicle scuttle to pass separately and downwardly over the parts 16, 17, and there is a partition 11 between the two parts so that the air flows separately through the two parts. The air flow over either part can be boosted by blower fans 19, 20 respectively situated in the ducts from the vent 15 to the parts 16, 17. There are guide blades 40, to distribute the air evenly over the widths of the parts.

A variable shuter or dump valve 21, controllable by a lever 9 inside the passenger compartment, passes all the air passing over the heat exchanger part 16 either into the passenger compartment through a vent 41, or dumps it outside the vehicle through a vent 42. The air from part 17 may be directed into the compartment without air from part 16. If desired the air from the vent 41 may pass through a duct 49 (FIGURE 3) to the rear compartment. The duct 43 can be closed by means of a flap 54.

Air passing over the part 17 is directed by a control valve 44 controlled by a lever 8 either into the passenger compartment through a hole 45 or into the bulkhead 14 through a hole 46 from whence it passes to a duct 47 leading to demisting outlets 48.

There are further air ducts 51, 52 leading from the air inlet duct of the heat exchanger part 17 to the interior of the vehicle. The ducts 51, 52 convey cold air to the area surrounding the passengers' faces and if desired can be closed by means of flaps 53. The pump 20 when operated will accelerate air flow through the ducts 51, 52.

The system also includes a secondary heat exchanger or radiator 27 located at the front of the vehicde and fed by ram air from the vehicle's motion.

Coolant from the engine (70 or 71) is pumped by the engine coolant pump (not shown) along a pipe 83 to a valve unit 25. There are three pipes 86, 84, 85 respectively leading from the valve unit 25 to the radiator 27, the heat exchanger part 16, and the heat exchanger part 17 via a metering valve unit 22. Pipes 87, 88 and 89 respectively lead back from the radiator 27, the part 16 and the part 17 to a pipe 90 for return flow to the engine.

The valve unit 25 is shown in detail in FIGURE 6 and comprises an inlet 60 from the pipe 83 and outlets 61, 62 and 63 to pipes 85, 84 and 86. There is a valve 64 operated by a wax pellet to control the flow of coolant to the outlet 63 to the pipe 86 and there is a switch 26 sensitive to the temperature of the coolant passing to the outlets 61, 62. There is a narrow by-pass 65 closed by a screw 66 which is opened to allow the system to be filled with coolant.

FIGURE 8 shows the electrical circuit for operating the fans 19 and 20. The fans are operated by motors 110, 111 respectively connected in parallel into the vehicle electrical system. The motor 110 is arranged to be operated either by the switch 26 or by a manual switch 112 on the instrument panel and the motor 111 is operated by a switch 113 also on the instrument panel. The switch 113 has three positions, off, slow (where the motor may be connected via a resistor) and full speed.

The thermally responsive switch 26, which may be overridden by a manual switch, controls the fan 19 and a switch inside the passenger compartment controls the fan 20.

A water metering valve unit 22 regulates the amount of coolant passing through part 17. The water metering valve unit is shown in detail in FIGURE 7 and has a thermally responsive element 23, operated by a probe 73 located immediately behind the vehicle fascia, in the air efflux from part 17.

The valve unit 12 comprises a metering valve 74 controlled by a lever 75 pivoted at 76 and operated by the element 23. The pivot 76 is attached to a lever 77 pivoted about a fixed pivot 78 and the position of the pivot 76 can be altered by means of the handle 79 which is settable from inside the passenger compartment. There is a roller 80 on the lever 77 and this roller follows the cam 81 attached to the handle 79.

The element 23 acts on the valve 74 to stabilise the temperature of the efflux at the selected setting of the handle 79. The coolant system is so arranged that, when valve 22 is open, the coolant tends to flow through part 17 in preference to part 16.

The operation of the system is as follows:

On starting up from cold, coolant is pumped from the engine through the heater/cooling unit and back to the engine, valve 64 in the unit 25 being closed. At a predetermined coolant temperature, valve 64 opens, and coolant then flows through both the radiator 27 and the heater/cooling unit. Should the coolant temperature become excessive, the switch 26 brings the fan 19 into operation which assists cooling by boosting the air flow over the part 16 of the heater/cooling unit. This sequence is entirely automatic, and beyond the control of the driver in the ordinary way.

The temperature of the air entering the passenger compartment is controlled by means of the dump valve 21, the metering valve unit 22 and the fan 20, the temperature of the air remaining substantially constant, due to control of the rate of coolant flow through the part 17 by the valve unit 22, regardless of change in the rate of air flow.

In normal operation in temperate ambient conditions, sufficient air at a temperature governed by the setting of the metering valve unit passes through the part 17 and thence into the passenger compartment to maintain a comfortable temperature. Additional air, if required, is supplied by switching on the fan 20.

In extreme conditions, and particularly to achieve a rapid warming of the passenger compartment from cold, the air passing over the part 16 is also directed to the interior of the car by means of the dump valve 21, and may be boosted by using the manual override switch to activate the fan 19. When operating under these conditions, the maximum speed of the fan 19 is limited to prevent an excess of air drawn over the heat exchangers causing overcooling of the engine.

In a simple way, it is thus possible for the occupants to achieve a high level of control over the air temperature within the passenger compartment.

Such a system is also particularly suited to an arrangement in which the coolant is sealed within the system there being a header tank 100 having a cap 101 which is secured after the system has been filled with coolant, and which is not intended to be readily removable and also a sealed extra volume tank 102 containing air.

I claim:
1. An engine cooling and interior heating system in motor vehicles having a passenger compartment comprising
 (a) a coolant jacket for cooling the engine,
 (b) a radiator with coolant connections to the jacket,
 (c) a first heat exchanger,
 (d) a second heat exchanger,
 (e) coolant connections connecting in parallel both said heat exchangers to said jacket,
 (f) means to direct a flow of air over both said heat exchangers,
 (g) means to direct at least some of the air flowing over the first heat exchanger into the passenger compartment,
 (h) valve means for varying the flow of coolant through the first heat exchanger,
 (i) means responsive to the temperature of the air flowing into the passenger compartment to control the valve means to tend to maintain the said temperature constant, and
 (j) means for directing the air which flows over the second heat exchanger outside the passenger compartment.

2. A motor vehicle as claimed in claim 1 having valve means, operable to direct at least part of the air, which flows over the said second part of the heat exchanger into the compartment.

3. A motor vehicle as claimed in claim 1 having means by which at least part of the air which flows through the said first part can be directed to demisting outlets for the vehicle windscreen.

4. A motor vehicle as claimed in claim 1 having means for automatically limiting flow of coolant through the radiator until the coolant temperature in some other part of the coolant system reaches a predetermined value.

5. A motor vehicle as claimed in claim 1 including a blower for causing air flow through said first heat exchanger part.

6. A motor vehicle as claimed in claim 1 including a blower for causing air flow through said second heat exchanger part and means operable when the temperature at some point in the coolant system reaches a predetermined value to cause the blower to operate.

7. In a motor vehicle of the kind having a passenger compartment, an engine, a coolant jacket for cooling the engine, and radiator with coolant connections to the jacket the combination of:
 (a) a two-part heat exchanger having a first part and a second part,
 (b) coolant connections connecting in parallel both parts of the heat exchanger to the jacket,
 (c) means to direct a flow of air over both parts,
 (d) means to direct at least some of the air flowing over the first part into the passenger compartment,
 (e) valve means for varying the flow of coolant through the first part,
 (f) means responsive to the temperature of the air flowing into the passenger compartment to control the valve means to tend to maintain the said temperature at a constant and adjustable value,
 (g) first means for directing the air which flows over the second part outside the passenger compartment,
 (h) second means for directing the air which flows over the second part inside the passenger compartment,
 (i) valve means operable to direct the air which flows over the second part to either of the first and second means,
 (j) means to limit automatically flow of coolant through the radiator until the coolant temperature in some other part of the coolant system reaches a predetermined value,
 (k) a first blower to cause air to flow through said first heat exchanger part, (l) a second blower to cause air to flow through said second heat exchanger part, and
(m) means operable automatically when the temperature at some point in the coolant system reaches a predetermined value to cause the second blower to operate.

References Cited by the Examiner

UNITED STATES PATENTS

| | | | |
|---|---|---|---|
| 2,019,991 | 11/1935 | Nilson | 237—12.3 X |
| 2,316,421 | 4/1943 | Hans | 237—12.3 X |
| 2,490,919 | 12/1949 | Raney | 237—8 |
| 2,703,680 | 3/1955 | Nallinger | 237—8 |
| 2,814,448 | 11/1957 | Schutt | 237—8 |

FOREIGN PATENTS 725,061   3/1955   Great Britain.

EDWARD J. MICHAEL, *Primary Examiner.*